(12) United States Patent
Rabnawaz et al.

(10) Patent No.: US 12,422,318 B2
(45) Date of Patent: Sep. 23, 2025

(54) IMPACT DETECTION COMPOSITE MATERIALS AND RELATED ARTICLES

(71) Applicant: BOARD OF TRUSTEES OF MICHIGAN STATE UNIVERSITY, East Lansing, MI (US)

(72) Inventors: Muhammad Rabnawaz, East Lansing, MI (US); Ramadan Mousa Abouomar, East Lansing, MI (US); Gary J. Blanchard, Okemos, MI (US); Sheryl Blanchard, Okemos, MI (US)

(73) Assignee: BOARD OF TRUSTEES OF MICHIGAN STATE UNIVERSITY, East Lansing, MI (US)

( * ) Notice: Subject to any disclaimer, the term of this patent is extended or adjusted under 35 U.S.C. 154(b) by 1077 days.

(21) Appl. No.: 17/401,500

(22) Filed: Aug. 13, 2021

(65) Prior Publication Data
US 2022/0057280 A1    Feb. 24, 2022

Related U.S. Application Data

(60) Provisional application No. 63/066,885, filed on Aug. 18, 2020.

(51) Int. Cl.
    *G01L 1/24*      (2006.01)
    *C08K 3/36*      (2006.01)
    (Continued)

(52) U.S. Cl.
    CPC ............. *G01L 1/247* (2013.01); *C08K 3/36* (2013.01); *C08K 5/11* (2013.01); *C08K 7/26* (2013.01)

(58) Field of Classification Search
None
See application file for complete search history.

(56) References Cited

U.S. PATENT DOCUMENTS

| | | | | |
|---|---|---|---|---|
| 5,325,721 A | * | 7/1994 | Pendergrass, Jr. | G01K 11/06 374/E11.006 |
| 2007/0161533 A1 | * | 7/2007 | Gonzales | C11D 17/049 510/438 |

(Continued)

FOREIGN PATENT DOCUMENTS

EP      2537666 A1    12/2012

*Primary Examiner* — Jeffrey D Washville
(74) *Attorney, Agent, or Firm* — MARSHALL, GERSTEIN & BORUN LLP (57) ABSTRACT

The disclosure relates to an impact detection composite as well as related articles and methods. The impact detection composite incorporates a plasticizer and plurality of microcapsules into a polymeric matrix. The microcapsules serve as a means for detecting impact on the composite or a substrate to which it is attached. A sufficiently forceful impact can rupture the microcapsules and release an indicator therein. Presence of the plasticizer in the matrix facilitates diffusion of the indicator through the matrix once released. This allows for rapid detection of the indicator, for example as a visually observable color or color change at an external surface of the impact detection composite. The detectable change provides a tamper-proof and non-electronic means for detecting an impact. The impact detection composites can be incorporated into a variety of articles and used in a variety of settings, for example to monitor personal safety, to monitor article integrity, etc.

25 Claims, 3 Drawing Sheets

(51) Int. Cl.
*C08K 5/11* (2006.01)
*C08K 7/26* (2006.01)

(56) References Cited

U.S. PATENT DOCUMENTS

2007/0197383 A1    8/2007  Koene et al.
2008/0277596 A1   11/2008  Oxley
2017/0089779 A1    3/2017  Dantus et al.
2017/0122855 A1*   5/2017  Dantus .................. A63B 71/08

* cited by examiner

IMPACT DETECTION COMPOSITE MATERIALS AND RELATED ARTICLES

CROSS REFERENCE TO RELATED APPLICATION

Priority is claimed to U.S. Provisional Application No. 63/066,885 (filed Aug. 18, 2020), which is incorporated herein by reference in its entirety.

STATEMENT OF GOVERNMENT INTEREST

None.

BACKGROUND OF THE DISCLOSURE

Field of the Disclosure

The disclosure relates to materials and articles that provide an indication of impact or compression forces experienced by the materials and articles. The disclosure relates more particularly to an impact detection composite as well as related articles and methods. The impact detection composite can be incorporated into a variety of articles and used in a variety of settings, for example to monitor personal safety, to monitor article integrity, etc.

Brief Description of Related Technology

Encapsulated dyes have been used in fiber-reinforced plastic laminates to act as indicator for damage. For example, dyes have been encapsulated in a melamine-formaldehyde resin, and glass fibers were used as a carrier medium in a laminate and coated on a surface. When the surface was subjected to damage by impact, the capsules release the dye and the color change was indicative of the impact. This method has several disadvantages. For example, it is a complex process requiring a mixture of dyes to develop the visible color change, the distribution of the microcapsules is very inhomogeneous, a fiberglass carrier medium is required for the microcapsules,) and the color change is only clear with high impact energy.

Phenolphthalein has been incorporated into polyurea microcapsules such that a color change is induced by a change in pH. This method has several disadvantages. For example, pH-induced color change is not useful for most of the applications, the color change needs a long time to be observed (typically more than 24 hours), the color change occurs at high temperatures of 80° C., the color change is not very clear because the released phenolphthalein is only 1% of the loading, and the results have high uncertainty because of the low concentration of the released dye.

EP2537666 is directed to a method of making an impact-indicating coating on a surface of an article. A prepreg includes a fibre ply pre-impregnated in a curable polymer composition containing a microencapsulated dye and an activator. The prepreg is applied to the surface of an article, and the prepreg is then cured.

U.S. Publication No. 2007/0197383 is directed to a method for detecting damage to an article caused by exposure to pressure. The article is covered by a pressure sensitive material including at least one dye and at least one activator. As the article is exposed to pressure, the pressure sensitive material undergoes a color change in response to exposure to a pressure wherein the article is damaged.

U.S. Publication No. 2008/0277596 is directed to impact indicating microcapsules. An impact indictor is coated on a structure to detect impacts thereon. The indicator may be provided within microcapsules. Upon rupture of the microcapsules, the indicator may be exposed to a pH activator, wherein the indicator may then exhibit fluorescence upon exposure to electromagnetic energy.

U.S. Publication No. 2017/0089779 is directed to materials with multiple impact level and torque detection. A multiple impact level detection assembly incorporates an impact detection medium, such as a plurality of microcapsules with an indicator therein. The detection assembly provides distinct impact patterns depending on the impact force and direction received by the detection assembly.

U.S. Publication No. 2017/0122855 is directed to materials with detectable compression memory. A dosimetric sock-detection substrate incorporates a plurality of microcapsules serving as an irreversible means for detecting impact on the substrate. A shock above a characteristic threshold level experienced by the substrate induces an irreversible detectable change associated with the microcapsules upon shock-induced rupture. The irreversible detectable change provides a tamper-proof and non-electronic means for detecting a shock or impact.

SUMMARY

The present disclosure relates to an impact detection composite that can exhibit a very rapid change in a detectable property, such as a rapid, visibly detectable color change resulting from release of a dye from a microcapsule within the composite. In particular, when a plasticizer (e.g., a liquid plasticizer at normal usage temperatures of the composite) is incorporated into the matrix of the composite, then the rate of change in color or other detectable property can be increased by one or more orders of magnitude relative an analogous matrix/microcapsule composite without the plasticizer. The plasticizers can facilitate the change in color or other detectable property by increasing the diffusion rate of a dye or other indicator in the matrix, after such dye or indicator is released from a ruptured microcapsule or microvessel upon an impact. Dye- or other indicator-loaded microvessels or other structures (e.g., nanotubes, fibers, capsules, latex) can be used as shock-indictors for packaging and non-packaging applications. For water-soluble dyes, hydrophilic plasticizers are suitably used in the matrix, and for oil-soluble dyes, oleophilic plasticizers are suitably used in the matrix. The plasticizers can be incorporated a wide range of matrices such as foams, lattices, films, composites (e.g., including a fiber or other functional reinforcement/dispersed phase in addition to microcapsules), etc. This approach can be extended to other applications such as chemical sensors, etc. with an indicator having a detectable property other than a visual change (e.g., instead of or in addition to a visual change).

The impact detection composite according to the disclosure has several advantages. The composite is based on environmentally friendly components. The matrix, microcapsules, and indicator can be formulated without Volatile Organic Compounds (VOC) emission during the process of preparation and application. The detection composite is simple use; an easily detectable color change can be induced by impact energy or scratch, which ruptures microvessels and causes the indicator to bleed and be transported to a surface where it is visually observable. The detection composite is easy to formulate because there is no need for any activator to develop the change of color. The detection composite can be used in a variety of setting, for example shipping/packaging boxes and bags, aircraft, boats, automobiles, and helmets. The surface of a substrate on which the detection composite is applied does not require any pretreating. Any conventional dye or other indicator can be encapsulated and used in the composite. Color change in the impact detection composite when using a dye or other visual indicator is autonomous, visible to the naked eye, and it does not need a sophisticated instrument to investigate. Further, such color change is fast and clear, typically becoming is clearly visible within 1 minute after impact (e.g., after 0.1, 1, 2, 5, or 10 seconds and/or up to 10, 20, 30, 40, 50, or 60 seconds). The non-toxic and environmentally friendly components of the detection composite make it safe for inclusion in any variety of articles, and it is non-corrosive. Moreover, the detection composites remain usable (e.g., are reusable) until the microcapsules sustain a sufficient impact force to rupture.

In one aspect, the disclosure relates to an impact detection composite comprising: a polymeric matrix; a plasticizer in the polymeric matrix; and a plurality of microcapsules distributed throughout an interior volume of the polymeric matrix (e.g., heterogeneously distributed throughout the matrix); wherein (A) each microcapsule comprises (i) an outer shell defining an interior microcapsule volume, and (ii) an indicator contained in the interior microcapsule volume, and (B) each microcapsule is configured to release the indicator upon rupture of the microcapsule to generate a change in a detectable property associated with the indicator (e.g., visible color from a released dye indicator). In some embodiments, the impact detection composite further comprises a detection substrate on an outer surface of the polymeric matrix.

Various refinements of the impact detection composite are possible.

In a refinement, the polymeric matrix comprises a polymer selected from the group consisting of poly(alkyl)acrylates, poly(vinyl nitriles), polyethylenes, polypropylenes, other polyolefins, polystyrenes, poly(ethylene-vinyl acetates), poly(vinyl chlorides), poly(acrylonitrile-butadiene-styrenes), polychloroprenes, polyurethanes, polyimides, polyetherimides, polyphenyleneoxides, polysiloxanes, polyepoxides, polyesters, phenolic resins, urea-formaldehyde resins, cellulose acetates, and combinations thereof.

In another refinement, the polymeric matrix is in the form of a film. For example, the film can be a cast film. Similarly, the film can comprise latex.

In another refinement, the polymeric matrix is in the form of a foam.

In another refinement, the polymeric matrix is optically translucent or transparent.

In another refinement, the plasticizer is selected from the group consisting of hydrophilic plasticizers, oleophilic plasticizers, and combinations thereof.

In another refinement, the plasticizer is selected from the group consisting of mono-, di-, and tri-glycerides of fatty acids, organosilanes and siloxanes, mono-, di-, and tri-esters of mono-, di-, and tri-carboxylic acids, trimellitates, adipates, sebacates, maleates, acetylated monoglycerides, methyl ricinoleate, azelates, benozates, di-alkyl phthalates, alkyl sulphonic acid phenyl esters, sulfonamindes, organophosphates, glycols, polyols, sugar alcohols, polyethers, and combinations thereof.

In another refinement, the plasticizer comprises an organosilane according to formula (I): X—R—Si(OR$^1$)(OR$^2$)(OR$^3$) (I); wherein: R, R$^1$, R$^2$, and R$^3$ are independently selected from hydrocarbon groups containing from 1 to 20 carbon atoms; and X is selected from hydrogen, an amino group, an epoxy group, a thiol group, a (meth)acrylic group, and a hydroxy group. Illustrative compounds of formula (I) include (3-glycidyloxypropyl)trimethoxysilane, (3-mercaptopropyl)trimethoxysilane, and (3-aminopropyl)triethoxysilane.

In another refinement, the plasticizer comprises a polysiloxane or an oligosiloxane comprising repeat units according to formula (II): —[Si(R$^1$R$^2$)—O—]—(II); wherein: R$^1$ and R$^2$ are independently selected from hydrocarbon groups containing from 1 to 20 carbon atoms. Illustrative compounds including the repeat units of formula (II) include poly(dimethylsiloxane) (PDMS) and other substituted or unsubstituted poly(dialkylsiloxanes) more generally. Such polysiloxanes suitably have a molecular weight in a range from 300-50000 g/mol (e.g., number-average molecular weight), for example a molecular weight of at least 300, 500, 1000, 2000, or 5000 and/or up to 3000, 5000, 10000, 20000, 30000, or 50000. In some embodiments, compounds including the repeat units of formula (II) can include one or more terminal and/or pendant functional groups (e.g., on R$^1$ and/or R$^2$), for example functional groups such as an amino group, a hydroxyl group, an epoxy group, and any combination thereof. An example of a suitable end group is a 3-aminopropyl group, for example a bis(3-aminopropyl) terminated PDMS or other poly(dialkylsiloxane).

In another refinement, the plasticizer is present in the impact detection composite in an amount in a range of 0.1 to 40 wt. % relative to the impact detection composite.

In another refinement, the indicator comprises an optical indicator contained in a fluid medium and having an optical detectable property.

In another refinement, each microcapsule further comprises a fluid medium contained in the interior microcapsule volume in which the indicator is dissolved. In a particular refinement, the fluid medium comprises a hydrophilic fluid medium; and the plasticizer comprises a hydrophilic plasticizer. In another particular refinement, the fluid medium comprises a oleophilic fluid medium; and the plasticizer comprises a oleophilic plasticizer.

In another refinement, each microcapsule has a characteristic impact threshold prior to rupture of the microcapsule and release of the indicator from the interior microcapsule volume to generate an irreversible change in a detectable property associated with the indicator.

In another refinement, the detectable property is selected from the group consisting of an optical property, an olfactory property, a chemical property, an electrical property, an electromagnetic property, and any combination thereof.

In another refinement, the microcapsules are present in the impact detection composite in an amount in a range of 1 to 50 wt. % relative to the impact detection composite.

In another refinement, the impact detection composite further comprises a means for attachment on an outer surface of the polymeric matrix.

In another aspect, the disclosure relates to a protective garment (e.g., a helmet or a wearable guard for other than a head body part) comprising the impact detection composite according to any of the various embodiments spatially positioned in or on the protective garment to detect impact experienced by a wearer of the protective garment.

In another aspect, the disclosure relates to a shipping or storage container comprising the impact detection composite according to any of the various embodiments spatially positioned in or on the container to detect impact experienced by the container during shipment or storage.

In another aspect, the disclosure relates to an electronic apparatus comprising the impact detection composite according to any of the various embodiments spatially positioned in or on the apparatus to detect impact experienced by the apparatus during shipment, storage, or use.

In another aspect, the disclosure relates to a footwear garment comprising the impact detection composite according to any of the various embodiments spatially positioned in or on the footwear garment to detect impact experienced by the garment during use.

In another aspect, the disclosure relates to vehicle or component thereof comprising the impact detection composite according to any of the various embodiments spatially positioned in or on the vehicle or the component thereof to detect impact experienced by the vehicle.

While the disclosed articles, methods and compositions are susceptible of embodiments in various forms, specific embodiments of the disclosure are illustrated (and will hereafter be described) with the understanding that the disclosure is intended to be illustrative, and is not intended to limit the claims to the specific embodiments described and illustrated herein.

BRIEF DESCRIPTION OF THE DRAWINGS

For a more complete understanding of the disclosure, reference should be made to the following detailed description and accompanying drawings wherein.

DETAILED DESCRIPTION

The disclosure relates to an impact detection composite as well as related articles and methods. The impact detection composite incorporates a plasticizer and plurality of microcapsules into a polymeric matrix. The microcapsule serve as a means for detecting impact on the composite or a substrate to which it is attached. A sufficiently forceful impact can rupture the microcapsules and release an indicator therein. Presence of the plasticizer in the matrix facilitates diffusion of the indicator through the matrix once released. This allows for rapid detection of the indicator, for example as a visually observable color or color change at an external surface of the impact detection composite. The detectable change provides a tamper-proof and non-electronic means for detecting an impact. The impact detection composites can be incorporated into a variety of articles and used in a variety of settings, for example to monitor personal safety, to monitor article integrity, etc.

Impact detection can be irreversible in the sense that an impact (e.g., shearing or shock force) experienced by the substrate above a characteristic threshold level induces an irreversible detectable change associated with the microcapsules upon impact-induced rupture (e.g., release of a detectable indicator (e.g., color indicator), as described herein). The microcapsules can impart compression memory to the impact detection composite, because the impact-induced rupture of the microcapsule provides a permanent, detectable indication of the impact event (e.g., the occurrence of the event and/or the location of the event), even after the impact event is completed.

In some embodiments, the impact detection composite includes a polymeric matrix, a plasticizer in the polymeric matrix, and a plurality of microcapsules distributed throughout an interior volume of the polymeric matrix. The plasticizer can be homogenously mixed or blended with the polymeric matrix. The microcapsules can be heterogeneously distributed throughout the polymeric matrix. As described in more detail below, each microcapsule generally includes an outer shell defining an interior microcapsule volume, and an indicator contained in the interior microcapsule volume. Each microcapsule is configured to release the indicator upon rupture of the microcapsule to generate a change in a detectable property associated with the indicator, for example a visible color from a released dye indicator. In some embodiments, the impact detection composite further includes a detection substrate on an outer surface of the polymeric matrix.

The disclosed impact detection composite offers several advantages over known impact detection systems. For example, the components of the disclosed impact detection composite typically are environmentally friendly such that the components are safe, non-toxic, non-corrosive, and easy to handle. Moreover, desirably the impact detection composite typically does not include volatile organic components (VOCs) emission during the process of preparation and application, which are known to be hazardous for the environment.

In another aspect, the disclosed impact detection composite is simple, for example, in some embodiments, the impact detection composite includes microcapsules containing a dye, such that a color change can be induced by impact energy or scratch. This force will break the microcapsules and the dye will bleed. As such, the impact detection composite is widely applicable to most packaging applications, as well as safety applications. The impact detection composite can be included in many articles, items, formats, and/or applications (e.g., shipping boxes and/or bags, aircraft, boat, automobile applications, safety equipment, protective garments (e.g., helmets), footwear garments, and the like.

Moreover, the disclosed impact detection composite is easy to formulate. For example, the dye can be any known dye, of any color, and there is no need for a activator to develop a change of color. In addition, an impact event is detected by an autonomous color change, which is visible to the naked eye requiring no instrumentation to detect. Further, the surface of the substrate (e.g., detection substrate) does not require pretreating to detect an impact.

In keeping with an aspect of the disclosed impact detection composite, when the indicator includes a colored dye, the appearance of color upon an impact is fast and clear. Typically, the color change is visible to the naked eye within about 1 minute of impact.

As described herein, the disclosed impact detection composite includes a polymeric matrix, a plasticizer in the polymeric matrix, and a plurality (e.g., dispersion) of microcapsules (also referred to herein as micro-vessels) in the polymeric matrix.

FIGS. 1-6 illustrate several embodiments of an impact detection composite 10 according to the disclosure as well as articles incorporating the impact detection composite 10.

Figure 1:
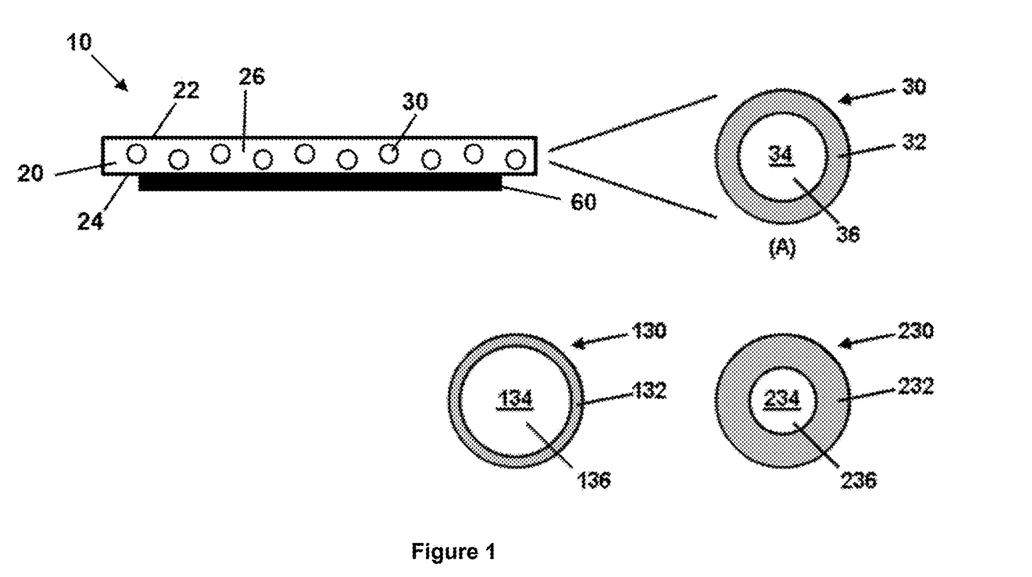
FIG. 1 is a side cross sectional view of an impact detection composite according to the disclosure and incorporating microcapsules distributed throughout an interior volume of a polymeric matrix, where insets A, B, and C illustrate different microcapsule structures.
Figure 2:
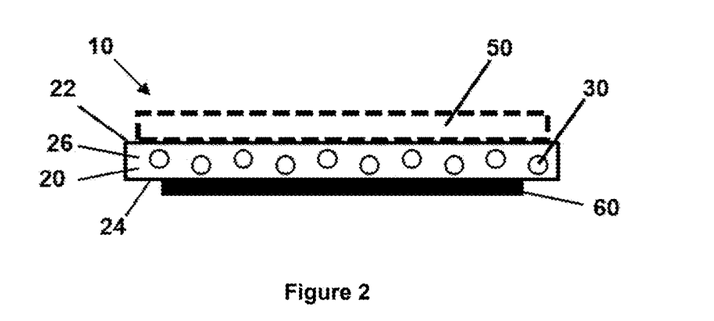
FIG. 2 is a side cross sectional view of an impact detection composite according to an additional aspect of the disclosure and incorporating microcapsules within the interior substrate volume and further comprising a detection substrate on an outer surface of the polymeric matrix.

With specific reference to FIGS. 1 and 2, the impact detection composite 10 includes a polymeric matrix 20 having an interior matrix volume 26 between the outer surfaces of the matrix (e.g., the top surface 22 and the bottom surface 24). As described in more detail below, the polymeric matrix 20 includes one or more polymers or copolymers primarily constituting the matrix, and it further includes a plasticizer distributed throughout the matrix. A plurality of microcapsules 30 is distributed throughout the interior matrix volume 26. Each microcapsule 30 can have a characteristic impact threshold (e.g., based in its physical, mechanical, and chemical properties, as described below) which corresponds to a threshold impact event above which a detectable change associated with the rupture of the microcapsule 30 and impact detection composite 10 takes place.

In some embodiments and as illustrated in FIG. 2, the impact detection composite 10 further can include a detection substrate 50 on an outer surface of the polymeric matrix 20, for example on the top surface 22 of the polymeric matrix 20 as illustrated FIG. 2. The detection substrate 50 is not particularly limited and can be a porous substrate such as, for example, a sheet/piece of paper or other cellulosic substrate bound, adhered, or otherwise attached to the outer surface of the polymeric matrix 20. More generally, the detection substrate 50 can be any porous or semi-porous substrate, whether cellulosic or otherwise, such as foam material. The detection substrate 50 rapidly displays a colorimetric (dye) indication when the microcapsules 30 rupture due to shock/impact, because of the presence of the plasticizer in the polymeric matrix 20. The detection substrate 50 can be white or have another opaque color selected to provide contrast with the indicator to facilitate visual detection.

In some embodiments, the impact detection composite 10 further can include an attachment means 60 disposed on any or several of its outer exposed surfaces, for example on the bottom surface 24 of the polymeric matrix 20 as illustrated FIGS. 1 and 2. The attachment means 60 can be used to affix the impact detection composite 10 another substrate, for example a surface of an article for which it is desired to detect whether an impact has occurred on the article. The attachment means 60 also can be used to modify (e.g., tune) an impact force experienced by the polymeric matrix. For example, when the attachment means 60 includes a foam, the attachment means can, for example, attenuate the force of an impact (e.g., have a cushioning effect), thereby adjusting or controlling the level of impact required to generate a color change. The attachment means 60 is not particularly limited and can include any conventional means for fixedly or removably mounting/attaching two surfaces, such as an adhesive coating (e.g., pressure-sensitive adhesive, cured/dried glue composition, foam) or a mechanical fastener (e.g., snaps, buttons, hook-and-loop fasteners, rivets, screws, etc.). The impact detection substrate 10 can include different types of attachment means 60, for example when more than one outer exposed surface includes the means 60.

Polymeric Matrix

The impact detection composite includes a polymeric matrix 20 having an interior matrix volume. The polymeric matrix 20 is not particularly limited. The polymeric matrix can be thin, rigid or flexible materials such as polymer materials (e.g., sheet or film). The polymeric matrix can be opaque, optically translucent, or transparent.

The polymeric matrix can include any suitable polymer or copolymer. It is desirable that the polymeric matrix is compatible with the other components of the impact detection composite, for example including the plasticizer and/or the microcapsules.

The specific polymeric materials used for the matrix 20 are not particularly limited and can include any conventional polymeric materials. The polymeric materials can variously include vinyl polymers and copolymers, step-growth polymers, thermoplastic polymers, thermoset polymers, etc. Examples of suitable polymeric materials include polyurethanes, poly(alkyl)acrylates, poly(alkyl)methacrylates, poly(vinyl nitriles), polyethylenes (e.g., HDPE, LDPE), polypropylenes, other polyolefins, polystyrenes, poly(ethylene-vinyl acetates), poly(vinyl chlorides), poly(acrylonitrile-butadiene-styrenes), polyimides, polyetherimides, polyphenyleneoxides, polychloroprenes, polysiloxanes, polyepoxides, polyesters (e.g., aliphatic, aromatic, or aliphatic-aromatic), phenolic resins, urea-formaldehyde resins, cellulose acetates, and combinations thereof (e.g., as blends thereof; as block- or random-copolymers of monomers thereof). Examples of suitable polymeric film materials, for example latex film materials, include polymers and copolymers of (alkyl)acrylates and (alkyl)methacrylates (e.g., n-butyl acrylate, methylmethacrylate, etc.). Examples of suitable polymeric foam materials include (thermoplastic) polyurethane foams, poly(vinyl nitrile) foams, and poly(ethylene-vinyl acetate) foams.

The polymeric matrix can have any suitable form (e.g., a film or a foam). As described herein, the polymeric matrix has an interior volume.

In some embodiments, the polymeric matrix is in the form of a film. In these embodiments, the film can be any suitable film (e.g., a cast film). In some embodiments, the polymeric matrix includes a film containing a latex. Moreover, the film can have any suitable porosity (e.g., porous, or non-porous). By way of example, in some embodiments, the polymeric matrix is a film including a latex, such that the latex particles are loosely in contact with each other, such that the film has a porosity due to the voids between the latex particles. Without wishing to be bound to any particular theory, it is believed that the voids can fill with plasticizer, as described herein, such that the filled voids function as a conduit for the indicator.

The impact detection composite 10 in the form of a film material including the polymeric matrix 20 with the microcapsules 30 therein can be formed according to any suitable conventional foam processing methods, such as casting, etc. For example, the polymeric material used for the polymeric matrix 20 can be provided in the form of a solvent solution, (aqueous) latex suspension, etc. The plasticizer is suitably dissolved or mixed in the liquid phase containing the polymeric material. The liquid mixture including the polymeric material and the plasticizer can then be combined or mixed with (already formed) microcapsules 30 then applied to a substrate to dry and evaporate the liquid medium, thereby forming a film of the polymeric material (i.e., as the matrix 20 of the impact detection composite 10) with the plasticizer and microcapsules 30 therein.

In some embodiments, the polymeric matrix is a foam. The polymeric matrix can include any suitable foam (e.g., flexible or rigid foam). In addition, the foam can be any suitable type of foam (e.g., open cell foam or closed cell foam).

The foam material is not particularly limited, and it can generally be any flexible foam used for padding or cushioning, for example whether for protection or comfort of a user wearing a garment or article incorporating the foam material. In various refinements, the foam material can be formed from a thermoplastic polymeric material or a (cross-linked) thermoset polymeric material. Further, the foam material can have an open cell structure (e.g., an open cell foam network of interconnected pores), a closed cell structure (e.g., discrete, generally non-connected pores), or a combination of both (e.g., some interconnected pore networks and some discrete, isolated pores). For thin foam films, the indicator (e.g., dissolved in a fluid medium) 36 should be visible upon microcapsule 30 rupture, regardless of whether the foam material has an open cell structure or a closed cell structure. In certain embodiments, for example when the microcapsules 30 contain a fluid indicator 36, an open cell structure for the foam can provide a means for capillary transport of fluid indicator upon microcapsule 30 rupture so that the indicator 36 can be transported throughout the interior matrix volume 26 of the foam to an exterior/outer surface 22, 24 thereof where it can be more easily detected (e.g., whether by visible or optical detection means or otherwise), for example on the detection substrate 50. Without wishing to be bound to any particular theory, it is believed that under pressure (e.g., from an impact force) the walls of the closed cell foam can break (e.g., rupture) along with the microcapsule 30, thus still permitting transport of the to release the indicator 36 throughout the interior matrix volume 26 of the foam to an exterior/outer surface 22, 24 thereof where it can be more easily detected.

The impact detection composite 10 in the form of a foam material including the foam polymeric matrix 20 with the microcapsules 30 therein can be formed according to any suitable conventional foam processing methods, such as blowing, extrusion, molding, etc. For example, the polymeric material used for the foam polymeric matrix 20 and the plasticizer can be combined or mixed with (already formed) microcapsules 30 along with a suitable blowing agent (e.g., chemical, physical, or other conventional gas blowing agent) and then blown, extruded, molded, etc., into a foam polymeric matrix 20 containing the microcapsules 30 distributed throughout the interior matrix volume 26. At the point when combined with microcapsules 30 and blowing agent, the polymeric material used for the foam matrix 20 can be in the form of a thermoplastic polymer melt, a liquid blend of monomers, comonomers, and/or prepolymers (e.g., which then will polymerize during the foaming process, such as to form a thermoplastic or thermoset polymeric foam), etc. In an embodiments wherein the polymeric matrix includes an open cell foam, the microcapsules can be loaded into (e.g., distributed) into the open cell foam before or after the foam is formed.

Plasticizer

The impact detection composite of the disclosure includes a plasticizer. When a plasticizer is included in the impact detection composite, as described herein, the diffusion of the indicator through the polymeric matrix upon rupture of the microcapsules is improved, which facilitates rapid detection of a change associated with the indicator.

The plasticizer can include a hydrophilic plasticizer, oleophilic plasticizer, and a combination thereof. The plasticizer is desirably compatible with the other components of the impact detection composite. (e.g. polymeric matrix, indicator, and the like). For example, a hydrophilic plasticizer is particularly suitable when the indicator is a water-soluble otherwise polar indicator such as a water-soluble dye. Similarly, an oleophilic or hydrophobic plasticizer is particularly suitable when the indicator is an oil-soluble otherwise non-polar indicator such as an oil-soluble dye. Selection of a plasticizer/indicator pair with compatible or otherwise similar chemical groups can facilitate a more rapid diffusive transport of the indicator from the matrix interior upon rupture to the matrix exterior where it is more easily detectable.

The plasticizer can be monomeric, oligomeric, or polymeric nature. In some embodiments, the plasticizer is suitably a liquid at room temperature, for example being liquid over a temperature range of about 15-30° C. or 20-25° C. Examples of suitable plasticizers include mono-, di-, and tri-glycerides of fatty acids (e.g., a natural oil such as a vegetable oil), organosilanes and siloxanes, mono-, di-, and tri-esters of mono-, di-, and tri-carboxylic acids (e.g., mono-, di-, and tri-alkyl citrates), trimellitates, adipates, sebacates, maleates, acetylated monoglycerides, methyl ricinoleate, azelates, benozates, di-alkyl phthalates, alkyl sulphonic acid phenyl esters, sulfonamindes, organophosphates, glycols (e.g., ethylene glycol, propylene glycol, and oligomers thereof), polyols (e.g., glycerin, trimethylolpropane, 2-methyl-1,3-propanediol), sugar alcohols (e.g., sorbitol, mannitol, xylitol), polyethers, and any combination thereof. When considering plasticizer/indicator compatibility, plasticizers including hydroxy groups or other polar functional groups (e.g., amino groups) can be characterized as hydrophilic, for example including such plasticizers as glycols, polyols, sugar alcohols, aminated molecules, oligoethers, etc. Similarly, plasticizers without such polar functional groups plasticizers can be characterized as oleophilic or hydrophobic for the purposes of plasticizer/indicator compatibility.

In some embodiments, the plasticizer includes olive oil. In some embodiments, the plasticizer includes a trialkyl citrate (e.g., tributyl citrate). In some embodiments, the plasticizer includes (3-aminopropyl)-triethoxysilane (APTES).

In some embodiments, the plasticizer includes a silicon-based plasticizer, for example an organosilane or a siloxane (e.g., polysiloxane or oligosiloxane). For example, the plasticizer can include an organosilane according to formula (I): X—R—Si(OR$^1$)(OR$^2$)(OR$^3$) (I). In formula (I), R, R$^1$, R$^2$, and R$^3$ can be the same or different hydrocarbon-based groups, for example including linear or branched alkyl, alkenyl, alkynyl, cycloalkyl, and/or aromatic groups, which can be unsubstituted or substituted with one or more heteroatoms (e.g., N, O, S) or heteroatom-containing groups (e.g., amino, hydroxy). For example, R, R$^1$, R$^2$, and R$^3$ each independently can contain from 1 to 20 carbon atoms, for example at least 1, 2, 3, 4, 6, 8, or 10 carbon atoms and/or up to 1, 2, 4, 6, 10, 12, 15, or 20 carbon atoms. In formula (I), X can be hydrogen or a functional group for compatibility with one or more composite 10 components, for example a polar group such as an amino group or a hydroxy group. Alternatively, the plasticizer can include a polysiloxane or an oligosiloxane including repeat units according to formula (II): —[Si(R$^1$R$^2$)—O—]—(II). In formula (II), R$^1$ and R$^2$ can be the same or different hydrocarbon-based groups, for example from the same options described above for formula (I).

Desirably, the plasticizer is homogenously mixed (e.g., blended) with the polymeric matrix.

The plasticizer can be present in any suitable amount. It is desirable that the plasticizer is present in an amount sufficient to facilitate diffusion of the indicator through the polymeric matrix to improve impact detection. If too little plasticizer is present, then an enhancement of diffusion will not be provided such that detection is not suitable (e.g., too slow, not visible, etc.). If too much plasticizer is present, a suitable background for detection may not be provided (e.g., unstable in color, too dark in color). For example, the plasticizer (or combination of more than one plasticizer) can be present in the impact detection composite in an amount in a range from 0.1 or 1 wt. % to 40 or 60 wt. %.

Typically, the plasticizer is present in an amount of 0.1 wt. % or more relative to the impact detection composite, for example, 0.5 wt. % or more, 1 wt. % or more, 1.5 wt. % or more, 2 wt. % or more, 2.5 wt. % or more, 3 wt. % or more, 3.5 wt. % or more, 4 wt. % or more, 4.5 wt. % or more, 5 wt. % or more, 5.5 wt. % or more, 6 wt. % or more, 6.5 wt. % or more, 7 wt. % or more, 7.5 wt. % or more, 8 wt. % or more, 8.5 wt. % or more, 9 wt. % or more, 9.5 wt. % or more, 10 wt. % or more, 10.5 wt. % or more, 11 wt. % or more, 11.5 wt. % or more, 12 wt. % or more, 12.5 wt. % or more, 12.5 wt. % or more, 13 wt. % or more, 13.5 wt. % or more, 14 wt. % or more, 14.5 wt. % or more, 15 wt. % or more, 15.5 wt. % or more, 16 wt. % or more, 16.5 wt. % or more, 17 wt. % or more, 17.5 wt. % or more, 18 wt. % or more, 18.5 wt. % or more, 19 wt. % or more, 19.5 wt. % or more, 20 wt. % or more, 20.5 wt. % or more, 21 wt. % or more, 21.5 wt. % or more, 22 wt. % or more, 22.5 wt. % or more, 23 wt. % or more, 23.5 wt. % or more, 24 wt. % or more, 24.5 wt. % or more, 25 wt. % or more, 25.5 wt. % or more, 26 wt. % or more, 26.5 wt. % or more, 27 wt. % or more, 27.5 wt. % or more, 28 wt. % or more, 28.5 wt. % or more, 29 wt. % or more, 29.5 wt. % or more, or 30 wt. % or more plasticizer relative to the impact detection composite.

Alternatively, or in addition to, the plasticizer typically is present an amount of 60 wt. % or less relative to the impact detection composite, for example, 59.5 wt. % or less, 59 wt. % or less, 58.5 wt. % or less, 58 wt. % or less, 57.5 wt. % or less, 57 wt. % or less, 56.5 wt. % or less, 56 wt. % or less, 55.5 wt. % or less, 55 wt. % or less, 54.5 wt. % or less, 54 wt. % or less, 53.5 wt. % or less, 53 wt. % or less, 52.5 wt. % or less, 52 wt. % or less, 51.5 wt. % or less, 51 wt. % or less, 50.5 wt. % or less, 50 wt. % or less, 49.5 wt. % or less, 49 wt. % or less, 48.5 wt. % or less, 48 wt. % or less, 47.5 wt. % or less, 47 wt. % or less, 46.5 wt. % or less, 46 wt. % or less, 45.5 wt. % or less, 45 wt. % or less, 44.5 wt. % or less, 44 wt. % or less, 43.5 wt. % or less, 43 wt. % or less, 42.5 wt. % or less, 42 wt. % or less, 41.5 wt. % or less, 41 wt. % or less, or 40.5 wt. %, 40 wt. % or less, 39.5 wt. % or less, 39 wt. % or less, 38.5 wt. % or less, 38 wt. % or less, 37.5 wt. % or less, 37 wt. % or less, 36.5 wt. % or less, 36 wt. % or less, 35.5 wt. % or less, 35 wt. % or less, 34.5 wt. % or less, 34 wt. % or less, 33.5 wt. % or less, 33 wt. % or less, 32.5 wt. % or less, 32 wt. % or less, 31.5 wt. % or less, 31 wt. % or less, or 30.5 wt. % or less plasticizer relative to the impact detection composite.

Thus, the impact detection composite can include an amount of plasticizer bound by any of the aforementioned endpoints, for example, 0.1 to 60 wt. %, 1 to 59 wt. %, 2 to 58 wt. %, 3 to 57 wt. %, 4 to 56 wt. %, 5 to 55 wt. %, 6 to 54 wt. %, 7 to 53 wt. %, 8 to 52 wt. %, 9 to 51 wt. %, 10 to 50 wt. %, 11 to 49 wt. %, 12 to 48 wt. %, 13 to 47 wt. %, 14 to 46 wt. %, 15 to 45 wt. %, 16 to 44 wt. %, 17 to 43 wt. %, 18 to 42 wt. %, 19 to 41 wt. %, 20 to 40 wt. %, 21 to 39 wt. %, 22 to 38 wt. %, 23 to 37 wt. %, 24 to 36 wt. %, 25 to 35 wt. %, 26 to 34 wt. %, 27 to 33 wt. %, 28 to 32 wt. %, or 29 to 31 wt. % plasticizer relative to the impact detection composite.

In some embodiments, the plasticizer is present in the impact detection composite in an amount in a range of 0.1 to 40 wt. % or 60 wt. % relative to the impact detection composite.

Microcapsules

The impact detection composite 10 of the disclosure includes a plurality of microcapsules 30 distributed throughout an interior volume 26 of the polymeric matrix 20.

The microcapsules include an outer shell defining a microcapsule interior microcapsule volume, wherein the microcapsule interior volume contains an indicator. The outer shell can include any suitable material. It is desirable that the outer shell be compatible with the other components of the microcapsule and of the impact detection composite, for example including the polymeric material of the matrix 20 and/or the plasticizer therein.

As illustrated in inset A of FIG. 1, a microcapsule 30 includes an outer shell 32 which defines (or encloses) a microcapsule interior volume 34 of the microcapsule 30. An indicator 36 associated with the irreversible detectable change of the microcapsule 30 and impact detection substrate 10 is contained in the microcapsule interior volume 34. The microcapsule 30 can be generally spherical in shape or otherwise, such as a cylindrical rod or disk, a prolate or oblate spheroid, etc. Suitable microcapsule 30 sizes are on the nanometer- or micrometer-scale, for example having a number-, volume-, or weight-based average, mean, median, or other characteristic size (e.g., diameter) in a range of about 10 nm to about 10 µm (e.g., at least 10 nm, 20 nm, 50 nm, 100 nm, or 200 nm and/or up to 100 nm, 200 nm, 500 nm, 1 µm, 2 µm, 5 µm, or 10 µm). The microcapsule interior volume 34 is suitably sealed/closed relative to the external environment by the microcapsule 30 outer shell 32. The outer shell 32 is suitably a polymeric shell material (e.g., an electrically conductive polymer or an electrically non-conductive polymer), such as polypyrrole, poly(methyl methacrylate), poly(benzyl methacrylate), poly(lactic acid), poly(acrylic acid), polyaniline, polysiloxane (e.g., networked or crosslinked silicone resin), or otherwise. The indicator 36 is suitably contained within a fluid medium (e.g., water medium, water-containing medium, organic solvent medium such as a hydrophobic solvent/liquid or hydrophilic solvent/liquid, and mixtures thereof) inside the microcapsule interior volume 34. The indicator 36 is suitably a colorant such as a non-toxic colorant. The indicator 36 can be dissolved, dispersed, emulsified, or otherwise mixed in the fluid medium. The fluid medium is suitably a non-toxic and/or a non-volatile carrier which can liquid and/or gel components.

The microcapsule 30 can be formed by any suitable method known in the art, for example including emulsion polymerization from an emulsion containing a fluid medium with the indicator 36 therein and at least one monomer corresponding to an outer shell 32 polymer. As the monomer is polymerized, it forms the shell 32 containing the indicator 36 therein. A suitable method of microcapsule 30 formation includes the photo-initiated emulsion polymerization of pyrrole monomer to form polypyrrole microcapsules 30 of relatively uniform size and containing any of a variety of materials (e.g., dyes, magnetic nanoparticles, ionic species) from the polymerization medium.

In an illustrative embodiment, the indicator 36 can include a hydrophobic colorant such as an oil-based paint, dye, or pigment in a hydrophobic liquid medium. Examples of suitable hydrophobic liquid media include oils such as vegetable oils (e.g., canola oil). The indicator 36 is a water-immiscible mixture which is then added to an aqueous reaction medium, which can include one or more water-miscible organic solvents (e.g., an alcohol-water mixture such as ethanol-water). The indicator 36 is then mixed or otherwise agitated with the aqueous reaction medium to form an emulsion of indicator 36 droplets in the reaction medium. The specific size (or size distribution) of indicator 36 droplets in the reaction medium can be selected or controlled, for example, by varying one or more of the degree of agitation or mixing, the selection and relative weight ratio of alcohol (or other water-miscible organic solvent) and water in the reaction medium, the weight ratio of reaction medium to the total indicator 36 added thereto, the selection of the hydrophobic liquid medium for the indicator 36, etc. Monomers for formation of a polymeric shell 32 are then added to the indicator 36 emulsion reaction medium along with any co-reactants, catalysts, and/or initiators desired for the polymerization. For example, pyrrole monomer and an aqueous iron (III) chloride oxidant solution can be added to the reaction medium. When polymerization is initiated the polymer (e.g., polypyrrole) forms as a shell 32 around the indicator emulsion 36 droplets, thereby forming a suspension of the microcapsules 30 in the reaction medium. The microcapsule 30 size and characteristic impact threshold can be controlled or selected, for example by varying one or more of the reaction/polymerization time, relative amount of monomer added to the reaction medium, and the emulsion droplet size. Once the polymerization reaction is complete, the microcapsules 30 can be collected/separated from the reaction medium by any suitable means (e.g., filtration) and incorporated into the impact detection composite 10 as generally described herein.

In an embodiment, the microcapsule 30 can have a (polymeric) silica outer shell 32. Specifically, the silica outer shell 32 can be formed from a networked or crosslinked silicone resin, for example resulting from the emulsion polymerization of silicone resin monomers in the presence of indicator 36 droplets in the reaction medium as described above. Suitable silicone resin monomers include silicates that can hydrolyze and then condense in an aqueous emulsion reaction medium to form the networked silicone resin (e.g., characterized by networked —SiO— repeating units) as the silica outer shell 32 encasing the indicator emulsion 36 droplets. Examples of specific silicates useful as such monomers include alkyl silicates with at least two, preferably at least three or four (e.g., three or four) hydrolyzable alkoxy groups. A general alkyl silicate is represented by the formula $Si(OR^1)_m(R^2)_{4-m}$, where m is 2, 3, or 4. In various reaction systems, one, two, three, or more different alkyl silicate species can be in used admixture as comonomers (e.g., alkyl silicates of the foregoing formula where at least one of $R^1$, $R^2$, and m are different between different alkyl silicate species). The $OR^1$ groups represent the hydrolyzable alkoxy groups, where two $OR^1$ groups (i.e., m=2) in a given silicate monomer promote polymeric chain growth or extension, while three or four $OR^1$ groups (i.e., m=3 or 4) in a given silicate monomer promote the growth of crosslinked or networked polymeric side chains. $R^1$ can be the same or different in each of the several $OR^1$ groups (e.g., when m=4, $R^1$ in each of the four $OR^1$ groups can be the same or different as $R^1$ in the other $OR^1$ groups). $R^1$ is generally an alkyl group, for example a linear or branched alkyl group with at least 1, 2, or 3 carbon atoms and/or up to 3, 4, 6, 9, or 12 carbon atoms (e.g., methyl, ethyl, propyl, isopropyl, butyl, isobutyl, tert-butyl, etc.). The $R^2$ groups, when present, can be the same or different and are generally non-hydrolyzable, substituted or unsubstituted, alkyl or alkenyl groups, for example a linear or branched, substituted or unsubstituted, alkyl or alkenyl group with at least 1, 2, or 3 carbon atoms and/or up to 3, 4, 6, 9, or 12 carbon atoms. The $R^2$ groups can be substituted with one or more ether groups, carbonyl groups, ester groups, hydroxy groups, an amino groups, such as at an interior location of the $R^2$ group chain and/or at a terminal location of the $R^2$ group chain (e.g., on the opposite chain end relative to the silicon atom). Inclusion of the non-hydrolyzable silicate $R^2$ group and selection of its chemical structure can provide control over resulting properties of the microcapsule 30, for example including one or more properties such as polarity, propensity to aggregate, etc. Additionally, for multi-step growth processes, the presence of non-hydrolyzable groups provides sites for attachment of functional groups and/or subsequent layers of material, if desired. For example, an $R^2$ group including an amino functional group (e.g., an aminoalkyl group such as in aminopropyltriethoxysilane or aminopropyltrimethoxysilane) can provide polar character to the resulting microcapsule 30. Similarly, an alkenyl $R^2$ group can provide a means for further vinyl polymerization of an outer polymer shell over the inner silica shell, such as with a (meth)acrylic or (meth)acrylate monomer, ethylene, propylene, or other olefin monomer, etc.

The specific alkyl silicates used are not particularly limited and can generally include those known for use in hydrolysis and condensation reactions to form silicones, silica, etc. Example alkyl silicates include tetraethylorthosilicate (TEOS; $R^1$ is $C_2H_5$ and m is 4), tetramethylorthosilicate (TMOS; $R^1$ is $CH_3$ and m is 4), aminopropyltriethoxysilane (APTES; $R^1$ is $C_2H_5$, m is 3, and $R^2$ is $C_3H_6NH_3$), aminopropyltrimethoxysilane (APTMS; $R^1$ is $CH_3$, m is 3, and $R^2$ is $C_3H_6NH_3$), octadecyl trimethoxysilane ($R^1CH_3$, m is 3, and $R^2$ is n-$C_{18}H_{37}$), vinyl triethoxysilane ($R^1$ is $C_2H_5$, m is 3, and $R^2$ is $CH{=}CH_2$ (vinyl)), and methoxy terminated-poly(ethylene glycol) (MPEG)-triethoxysilane ($R^1$ is $C_2H_5$, m is 3, and $R^2$ is methoxy terminated-poly(ethylene glycol)).

An example process for forming silica microcapsules 30 is as follows. An oil-soluble dye is dissolved in an oil or other hydrophobic liquid of interest to form an indicator 36 as above. An aliquot of the dye-containing oil indicator 36 is then added to a mixture of neat tetraethylorthosilicate (TEOS) and neat aminopropyltriethoxysilane (APTES) silica monomers at a desired molar ratio. The selected molar ratio range can vary broadly, for example ranging from 1:100 APTES:TEOS to 1:1 APTES:TEOS. Similar ranges apply to other silane mixtures (e.g., where the APTES amount can be representative of another silane with a functional group other than alkoxy and/or alkyl, and the TEOS amount can be representative of another silane with only alkoxy and/or alkyl functional groups). The molar ratio can be selected to control rigidity, aggregation properties, and/or surface chemical reactivity of the microcapsules 30. The oil and silicate/silane reagents are immiscible and initially separated; subsequent mechanical agitation is used to produce an emulsion of the oil indicator 36 droplets in the liquid monomer medium. An aliquot of the TEOS/APTES/dye-containing oil suspension is then introduced into an aqueous solution of a surfactant such as cetyltrimethylammonium bromide (CTAB) at a selected molar concentration. The concentration of the surfactant can be selected as desired (e.g., up to about 0.1 M, whether for CTAB or other surfactant) to control the formation and size of the suspended oil droplets that get coated with the siloxane (e.g., which generally corresponds to the resulting microcapsule 30 size). This mixture is vortexed or otherwise further agitated to mix the dye oil indicator 36 droplets into the formed emulsion of the TEOS/APTES and aqueous CTAB system. Upon exposure to water in the aqueous surfactant solution, the alkoxy groups of the TEOS/APTES reagents hydrolyze to their silanol analogs and then condense to form a polymerized silica network as the outer shell 32 on the surface of the suspended dye oil indicator 36 droplets. The CTAB functions as a surfactant to stabilize the oil indicator 36 droplets and keeps them separated during the active polymerization process. After vortexing, the solution is allowed to settle. The emulsion resolves during settling into a system which contains dye-containing oil indicator 36 droplets encapsulated in silica shell 32 microspheres 30 and an aqueous phase. The duration of the silane encapsulating reaction is related to the thickness of the resulting siloxane layer as the outer shell 32 covering the oil indicator 36 droplets, and the reaction time can be suitably selected to control shell 32 thickness to have a desired characteristic impact threshold.

In some embodiments, the outer shell of the microcapsule includes silica.

The indicator can be any suitable indicator. It is desirable that the indicator is compatible with the other components of the impact detection composite.

In some embodiments, the indicator includes an optical indicator contained in a fluid medium and having an optical detectable property.

In some embodiments, the microcapsules further include a fluid medium contained in the interior microcapsule volume in which the indicator is dissolved. In these embodiments, the indicator 36 is suitably contained within a fluid medium (e.g., water medium, water-containing medium, organic solvent medium such as a hydrophobic solvent/liquid or hydrophilic solvent/liquid, and mixtures thereof) inside the interior microcapsule volume 34. The indicator 36 is suitably a colorant such as a non-toxic colorant. The indicator 36 can be dissolved, dispersed, emulsified, or otherwise mixed in the fluid medium. The fluid medium is suitably a non-toxic and/or a non-volatile carrier which can liquid and/or gel components. In some embodiments, the fluid medium in the microcapsules can be or otherwise include the same material as the plasticizer in the polymeric matrix to promote compatibility and diffusive transport of the indicator upon rupture of the microcapsule.

In some embodiments, the fluid medium includes a hydrophilic fluid medium and the plasticizer includes a hydrophilic plasticizer. For example, the fluid medium can include water, glycerol, etc.

In some embodiments, the fluid medium includes an oleophilic fluid medium and the plasticizer includes an oleophilic plasticizer. For example, the fluid medium can include a vegetable oil or other natural oil (triglyceride), a mineral oil, etc.

The microcapsules are present in the impact detection composite in a suitable amount. For example, the microcapsules can be present in the impact detection composite in an amount in a range from 0.1 or 1 wt. % to 40 or 50 wt. %. Typically, the microcapsules are present in an amount of 1 wt. % or more relative to the impact detection composite. For example, the microcapsules can be present in an amount of 1.5 wt. % or more, 2 wt. % or more, 2.5 wt. % or more, 3 wt. % or more, 3.5 wt. % or more, 4 wt. % or more, 4.5 wt. % or more, 5 wt. % or more, 5.5 wt. % or more, 6 wt. % or more, 6.5 wt. % or more, 7 wt. % or more, 7.5 wt. % or more, 8 wt. % or more, 8.5 wt. % or more, 9 wt. % or more, 9.5 wt. % or more, 10 wt. % or more, 10.5 wt. % or more, 11 wt. % or more, 11.5 wt. % or more, 12 wt. % or more, 12.5 wt. % or more, 13 wt. % or more, 13.5 wt. % or more, 14 wt. % or more, 14.5 wt. % or more, 15 wt. % or more, 15.5 wt. % or more, 16 wt. % or more, 16.5 wt. % or more, 17 wt. % or more, 17.5 wt. % or more, 18 wt. % or more, 18.5 wt. % or more, 19 wt. % or more, 19.5 wt. % or more, 20 wt. % or more, 20.5 wt. % or more, 21 wt. % or more, 21.5 wt. % or more, 22 wt. % or more, 22.5 wt. % or more, 23 wt. % or more, 23.5 wt. % or more, 24 wt. % or more, 24.5 wt. % or more, or 25 wt. % or more microcapsules relative to the impact detection composite.

Alternately, or in addition, the microcapsules can be present in an amount of 50 wt. % or less, for example, 49.5 wt. % or less, 49 wt. % or less, 48.5 wt. % or less, 48 wt. % or less, 47.5 wt. % or less, 47 wt. % or less, 46.5 wt. % or less, 46 wt. % or less, 45.5 wt. % or less, 45 wt. % or less, 44.5 wt. % or less, 44 wt. % or less, 43.5 wt. % or less, 43 wt. % or less, 42.5 wt. % or less, 42 wt. % or less, 41.5 wt. % or less, 41 wt. % or less, 40.5 wt. % or less, 40 wt. % or less, 39.5 wt. % or less, 39 wt. % or less, 38.5 wt. % or less, 38 wt. % or less, 37.5 wt. % or less, 37 wt. % or less, 36.5 wt. % or less, 36 wt. % or less, 35.5 wt. % or less, 35 wt. % or less, 34.5 wt. % or less, 34 wt. % or less, 33.5 wt. % or less, 33 wt. % or less, 32.5 wt. % or less, 32 wt. % or less, 31.5 wt. % or less, 31 wt. % or less, 30.5 wt. % or less, 30 wt. % or less, 29.5 wt. % or less, 29 wt. % or less, 28.5 wt. % or less, 28 wt. % or less, 27.5 wt. % or less, 27 wt. % or less, 26.5 wt. % or less, 26 wt. % or less, or 25.5 wt. % or less microcapsules relative to the impact detection composite.

Thus, the impact detection composite can include an amount of microcapsules bounded by any of the aforementioned endpoints. For example, the impact detection composite can include 1 to 50 wt. % microcapsules, 1.5 to 49.5 wt. %, 2 to 49 wt. %, 2.5 to 48.5 wt. %, 3 to 48 wt. %, 3.5 to 47.5 wt. %, 4 to 47 wt. %, 4.5 to 46.5 wt. %, 5 to 46 wt. %, 5.5 to 45.5 wt. %, 6 to 45 wt. %, 6.5 to 44.5 wt. %, 7 to 44 wt. %, 7.5 to 43.5 wt. %, 8 to 43 wt. %, 8.5 to 42.5 wt. %, 9 to 42 wt. %, 9.5 to 41.5 wt. %, 10 to 41 wt. %, 10.5 to 40.5 wt. %, 11 to 40 wt. %, 11.5 to 39.5 wt. %, 12 to 39 wt. %, 12.5 to 38.5 wt. %, 13 to 38 wt. %, 13.5 to 37.5 wt. %, 14 to 37 wt. %, 14.5 to 36.5 wt. %, 15 to 36 wt. %, 15.5 to 35.5 wt. %, 16 to 35 wt. %, 16.5 to 34.5 wt. %, 17 to 34 wt. %, 17.5 to 33.5 wt. %, 18 to 33 wt. %, 18.5 to 32.5 wt. %, 19 to 32 wt. %, 19.5 to 31.5 wt. %, 20 to 31 wt. %, 20.5 to 30.5 wt. %, 21 to 30 wt. %, 21.5 to 29.5 wt. %, 22 to 29 wt. %, 22.5 to 28.5 wt. %, 23 to 28 wt. %, 23.5 to 27.5 wt. %, 24 to 27 wt. %, 24.5 to 26.5 wt. %, or 25 to 26 wt. % microcapsules relative to the impact detection composite.

In keeping with an aspect of the disclosed impact detection composite, each microcapsule 30 has a characteristic impact threshold prior to rupture of the microcapsule 30 and release of the indicator 36 from the microcapsule interior volume 34 to generate an irreversible change in the detectable property associated with the indicator 36. When the microcapsule 30 experiences an impact force below the threshold value, the shock is absorbed by the microcapsule 30 (e.g., possibly causing it deform (reversibly or irreversibly), but not rupture or otherwise break). When the microcapsule 30 experiences an impact force above the threshold value, the microcapsule 30 breaks, releasing the indicator 36 and causing the irreversible detectable impact event associated therewith. The characteristic impact threshold is generally a function of the mechanical properties of the microcapsule 30 and its contents. Factors affecting the impact threshold can include, for example, diameter (D) or other characteristic size of the microcapsule 30/outer shell 32, thickness (T) of the outer shell 32 wall, mechanical/strength properties of the shell 32 material, and the material contained within the microcapsule interior volume 34. Depending on the particular method used for making the microcapsule 30, the microcapsule material and corresponding geometric parameters of the microcapsule can be suitably controlled or selected to obtain a desired impact threshold. For example, when using an emulsion polymerization process (e.g., UV photo-initiated emulsion polymerization), the characteristic impact threshold of the microcapsule 30 can be been selected by controlling or selecting one or more polymerization reaction conditions, such as reaction solvent, polymerization initiator, monomer, ionic strength of reaction medium, reaction medium pH, reaction temperature, reaction time, emulsion droplet size, and UV light exposure.

A plurality of microcapsules 30 similarly has a characteristic impact threshold distribution associated therewith, which can result from capsule-to-capsule variability for individual microcapsules 30. Suitably, the variability is small and the corresponding impact threshold distribution is relatively narrow, thus reducing the likelihood or impact of false negatives or false positives resulting from individual microcapsules 30 which are stronger or weaker than intended. For example, on a number-, volume-, or weight-basis, the plurality of microcapsules 30 suitably has a characteristic impact threshold distribution such that at least 75%, 90%, 95%, or 99% of the microcapsules 30 have an individual characteristic impact threshold that is within 1%, 5%, 10%, or 25% of an average (or mean or median) impact threshold of the distribution. The desirably narrow impact threshold distribution can be obtained by forming the microcapsules 30 with correspondingly narrow distributions related to diameter and wall thickness.

In some embodiments, the impact detection composite 10 can incorporate a single plurality of microcapsules 30, all of which microcapsules 30 in the plurality are characterized by a single impact threshold distribution (e.g., all microcapsules 30 may be represented by a single distribution as represented above). In other embodiments, the impact detection composite 10 can incorporate multiple different groups of microcapsules 30. For example, as illustrated in insets B and C of FIG. 1, a first microcapsule 130 includes an outer shell 132 which defines (or encloses) an interior microcapsule volume 134 of the first microcapsule 130, and a second microcapsule 230 includes an outer shell 232 which defines (or encloses) an interior microcapsule volume 234 of the second microcapsule 230. As qualitatively illustrated, the outer shell 132 is thinner than the outer shell 232, and the characteristic impact threshold of the first microcapsule 130 can be correspondingly smaller than that of the second microcapsule 230 (e.g., when the diameter and other properties of the two microcapsules 130, 230 are the same or substantially similar). Thus, in some embodiments, the impact detection composite 10 can include a plurality of the first microcapsules 130 having a first characteristic impact threshold and a plurality of the second microcapsules 230 having a second characteristic impact threshold (e.g., where the first characteristic impact threshold is different from the second characteristic impact threshold). Suitably, the detectable property of the first indicator 136 is different from the detectable property of the second indicator 236.

The first and second detectable properties can be different, for example, by using different indicators or by using the same indicators at different concentrations or in other ways to provide different responses. As noted above, different impact thresholds are controllable or selectable by varying wall thickness, microcapsule diameter, polymerization conditions, polymer selection, etc. In this way, microcapsules with different impact threshold levels and different detectable properties (e.g., different generated colors) allow for differentiation of low/high impacts. For example, the first characteristic impact threshold may be 100 units (e.g., arbitrary relative units corresponding to impact force), and the second characteristic impact threshold may be 200 units, where the threshold levels are selected to correspond to warning and damage levels, for instance. When the impact detection composite 10 is incorporated into an article, a detection corresponding to the low threshold may indicate the possibility of a damaging impact to the article sometime in the past (e.g., and the article should be inspected for damage), and a detection corresponding to the high threshold may positively indicate a damaging impact to the article sometime in the past (e.g., and the article should be rejected or discarded as damaged). Similarly, when the impact detection composite 10 is incorporated into a personal protective garment worn by a user, a detection corresponding to the low threshold may indicate the possibility of a damaging impact to the user (e.g., and the user may need medical attention), and a detection corresponding to the high threshold may positively indicate a damaging impact to the user (e.g., and the user should receive immediate medical attention). Although described in the context of two distinct types of microcapsules 130, 230, impact detection composite 10 according to the disclosure more generally can include any number of different microcapsule types (e.g., n different microcapsule types with n different detectable properties and/or n different impact thresholds, such as n being at least 2, 3, or 5 and/or up to 3, 5, 10, or 20).

Figure 3:
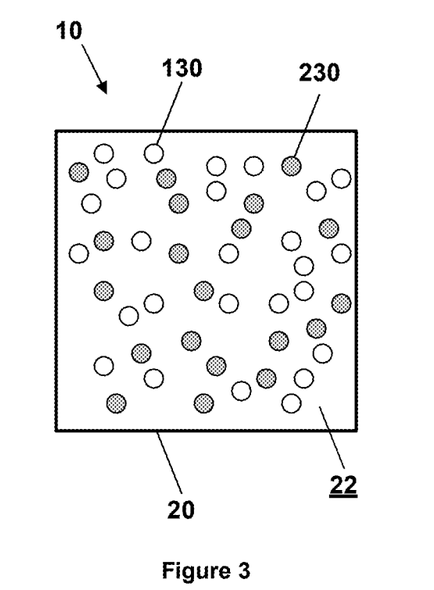
FIG. 3 is a top view of an impact detection composite according to an additional aspect of the disclosure and incorporating a plurality of different microcapsule types homogeneously distributed throughout a substrate surface.
Figure 4:
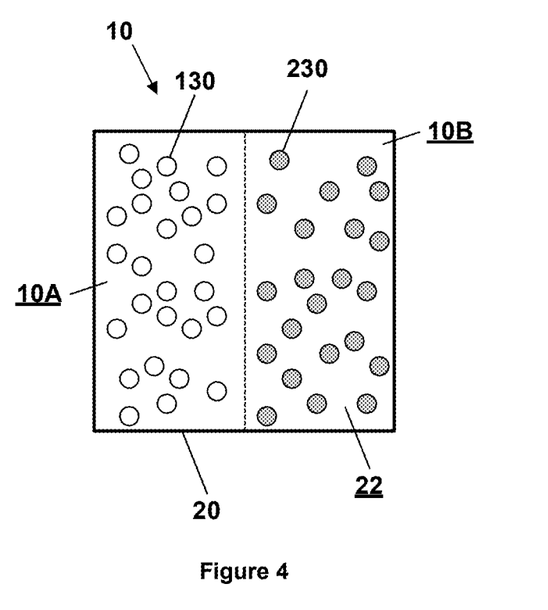
FIG. 4 is a top view of an impact detection composite according to an additional aspect of the disclosure and incorporating a plurality of different microcapsule types spatially segregated in different regions of a substrate surface.

FIGS. 3 and 4 illustrate some impact detection composite 10 embodiments incorporating the different microcapsules 130, 230.

In FIG. 3, the plurality of the first microcapsules 130 and the plurality of the second microcapsules 230 are homogeneously distributed throughout a region of the polymeric matrix 20. The combination of high- and low-impact detection microparticles mixed together provides spatially integrated result over the matrix 20 area. A low impact releases just the first indicator 136, and a high impact releases both the first and second indicators 136, 236. Detection of neither indicator in an area means that the area sustained no impact above the low threshold; detection of just the first indicator 136 in an area means that the area sustained an impact between the low and high thresholds; and detection of at least the second indicator 236 (or both indicators 136, 236) in an area means that the area sustained an impact above the high threshold. As an illustrative example, a yellow optical indicator may be used for the first indicator 136 and a blue optical indicator may be used for the second indicator 236. In such case, a detectable yellow result means an impact was between the low and high impact threshold levels, while a detectable green result (e.g., indicative of blue and yellow mixing) means impact was above the high impact threshold levels. Thus, the impact detection composite 10 provides an irreversible spatial contour impact map (which can be integrated over substrate area) showing areas of (i) below low impact, (ii) between high and low impact and (iii) above high impact. In an extension, more contours/impact levels are possible using more distinct indicators having differentiable detectable properties when cumulatively ruptured.

In FIG. 4, the plurality of the first microcapsules 130 and the plurality of the second microcapsules 230 are spatially segregated in separate regions 10A, 10B of the polymeric matrix 20. Such separation into distinct regions 10A, 10B can be used to differentiate different impact levels among them, for example where the different regions 10A, 10B represent more and less impact-sensitive regions of an article incorporating the impact detection composite 10. In this embodiment, it is also possible for the first and second detectable properties to be the same (e.g., same colors) or different, because a known, pre-selected spatial segregation of the microcapsules 130, 230 can differentiate the high/low impact results even if the detectable properties are the same.

The detectable property associated with the indicator 36 can be a property of the indicator 36 itself and/or a property of the environment surrounding the microcapsule 30 and affected by the indicator 36 after rupture of the microcapsule 30 and release of the indicator 36. The detectable property can variously correspond to an irreversible transition from a first state to a second state for the microcapsule 30 and/or indicator 36 in which the property is (i) detectable in the first state but not the second state, (ii) detectable in the second state but not the first state, or (iii) detectable but different in both states. Detection can be by human inspection (e.g., visual inspection or smelling for optical or olfactory indicators, respectively) or machine-assisted for the particular property being detected. The detectable property can include one or more of an optical property, an olfactory property, a chemical property, an electrical property, and an electromagnetic property associated with the indicator 36.

An optical property can correspond to color change or color generation, electromagnetic radiation emission at one or more wavelengths (e.g., light in the UV, visible, and or IR spectrum), or optical transmission at one or more wavelengths (e.g., in the UV, visible, and or IR spectrum). As noted, optical properties can be detectable by visual inspection (human eye), by conventional optical detection equipment, or both. Example optical indicators include dyes or pigments having a detectable color in the visible spectrum and fluorophores excitable with incident light and producing a detectable UV or visible light emission. Suitable fluorescent probes and indicator dyes (e.g., pH-sensitive, $Ca^{2+}$-sensitive, or otherwise) include fluoresceins, carboxyfluoresceins, hydroxypyrenes, rhodamines, disodium fluorescein, nile red, nile blue, cresyl violet, and acridine orange (e.g., available from Sigma-Aldrich, St. Louis, MO). Example calcium indicators (molecular probes) include calcium green, calcium orange, calcium crimson, fluoresceins, furanosines, indocyanines, and rhodamines (e.g., life technologies products available from Thermo Fisher Scientific, Waltham, MA). Such dyes, pigments, and/or fluorophores can be dissolved or suspended in a fluid medium contained within the microcapsule 30 prior to rupture and released therefrom after rupture. In some embodiments, the optical indicator can initially be undetectable (e.g., clear or colorless) when inside the microcapsule 30, becoming optically detectable only after rupture and release from the microcapsule 30.

An olfactory property can correspond to the generation of a detectable scent (e.g., by human nose), such as resulting from the release of a scented olfactory indicator from the microcapsule 30 after rupture. Example olfactory indicators include any of a variety of inorganic or organic compounds at a concentration/amount sufficient to generate a detectable scent upon release, for instance linear, cyclic, and/or aromatic organic compounds having one or more aldehyde, ketone, and/or alcohol functional groups such as biacetyl, camphor, or cinnamaldehyde.

A chemical property can correspond to the generation of a detectable chemical property, which itself could be detectable, for example including the release of an acid or base indicator detectable as pH value after rupture. Similarly, the microcapsule 30 rupture event could induce a different detectable chemical property, for example pH change resulting from the release of an acid or base indicator which then induces a color change via a pH indicator external to the ruptured microcapsule 30, for example a pH indicator incorporated on or in the polymeric matrix 20 surrounding the microcapsule 30.

An electrical property can correspond to the generation of a voltage or current, a change in conductivity, etc. following release of an electrical indicator. Example electrical indicators include (aqueous) solutions with one or more metal-containing compounds such as metal salts (e.g., alkali or alkali earth metal salt with an organic or inorganic anion such as a halogen). For instance, the detection substrate 50 can include wires or other electrical leads that do not form a complete electrically conductive path between electrical input and output regions of the substrate when initially formed. When the electrical indicator is (for example) an aqueous metal salt solution (e.g., sodium chloride) contained in the microcapsule 30, rupture of the microcapsule 30 can release the metal salt, which in turn provides detectable electrical connectivity between the previously unconnected electrical leads.

Articles

The impact detection composite 10 can be incorporated into a variety of articles and used in a variety of settings, for example to monitor personal safety, to monitor article integrity, etc. For example, the impact detection composite 10 can be affixed to another substrate, such as a surface of an article for which it is desired to detect whether an impact has occurred on the article.

In an embodiment, the impact detection composite 10 can be spatially positioned into/onto a protective or other garment or wearable article to detect impact experienced by a wearer of the (protective) garment or article and/or to detect impact experienced by the impact detection composite itself from a wearer of the article or garment. In various embodiments, the impact detection composite can provide an indication when a wearer of the garment or article has sustained an impact or impact at or above a safe level. In other embodiments, the impact detection composite can provide an indication when the substrate has reached the end of its useful life (e.g., when the substrate itself provides some padding or cushion functionality such as when it has a foam structure with the microcapsules therein). In some embodiments, the protective garment is a helmet (e.g., sporting helmet such as for football, hockey, biking, skiing, motorcycling, snowmobiling, etc.; combat helmet). In other embodiments, the protective garment is a wearable guard for other than a head body part (e.g., chest, shoulder, back, arm, groin, leg, etc. for sporting in general or a specific sport such as those above). In other embodiments, the garment is a footwear garment (e.g., shoes, boots, etc. for athletic footwear, sporting footwear, casual footwear) and the impact detection composite can be a component of the sole (e.g., insole), in particular when it includes a foamed substrate with the microcapsules distributed therein. In other embodiments, the wearable article is a wearable prosthetic (e.g., wearable prosthetic arm, leg, or other limb) and the impact detection composite is a component of the prosthetic's comfort padding for interfacing with the wearer's body parts, in particular when it includes a foamed substrate with the microcapsules distributed therein.

Figure 5:
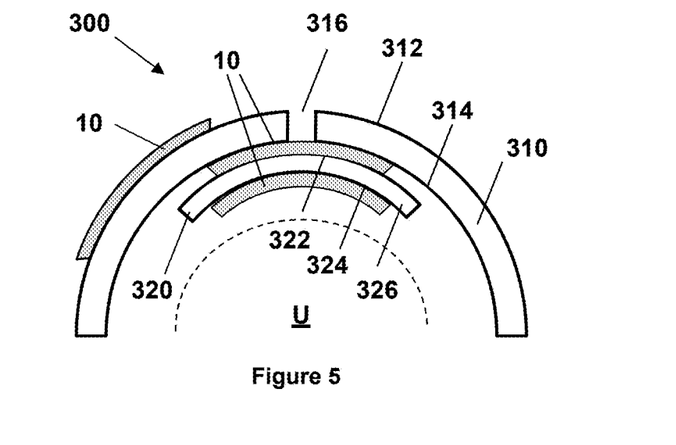
FIG. 5 is a side cross sectional view of a protective garment incorporating an impact detection composite according to the disclosure.

FIG. 5 illustrates a protective garment 300 according to the disclosure. The protective garment 300 in FIG. 5 is illustrated in a generally curved shape suitable for a helmet, but it can correspond to other garment and wearable article types as noted above. The protective garment 300 includes a protective shell 310 having an outer surface 312 and an opposing inner surface 314. The protective shell 310 is generally a rigid, impact-resistant material such as formed from a plastic/polymeric material or composite (e.g., molded polycarbonate for football helmets). For the protective shell 310, the outer surface 312 is a relative term denoting the external surface exposed to the environment and/or representing the impact surface when the protective garment 300 is worn by a user or wearer U, and the inner surface 314 similarly represents the surface internal to the protective garment 300 and closest to the user U when worn. The protective garment 300 further includes protective padding 320 having an outer surface 322, an opposing inner surface 324, and an interior padding volume 326 between the outer surface 322 and the inner surface 324. The protective padding 320 is mounted at the outer surface 322 thereof to the protective shell 310 at the inner surface 314 thereof (e.g., directly or indirectly with an impact detection composite 10 or other intervening component). The protective padding 320 is generally a soft, flexible impact-absorbing material such as formed from polymeric foams, gels, cloth/fabric, inflatable gas (air) bladders, etc. (e.g., example: poly(vinyl nitrile) foam, expanded polypropylene foam of varying densities encased in a shell such as polyethylene for football helmets). Similar to the protective shell 310, the protective padding 320 outer surface 322 is a relative term denoting the surface closest to the protective shell 310 and farthest away from the user U when the protective garment 300, and the inner surface 324 represents the surface internal to the protective garment 300 and closest to the user U when worn. Two surfaces/structures mounted to each other (e.g., the protective shell 310 and the protective padding 320) can be fixedly or removably attached to each other (e.g., generally in a fixed position relative to each other while mounted), either directly or indirectly, such as by any suitable means for attachment. Example means for attachment can include those described above for the impact detection composite 10, including adhesive coatings, mechanical fasteners, etc.

As further shown in FIG. 5, the impact detection composite 10 can be incorporated into the protective garment 300 at any of a variety of locations. For example, the impact detection composite 10 can be positioned at one or more of an interface between the protective shell 310 inner surface 314 and the protective padding 320 outer surface 322, the interior padding volume 326, the protective padding 320 inner surface 324, and the protective shell 310 outer surface 312. The impact detection composite 10 can be mounted or adhered to the protective shell 310 and/or protective padding 320 using the means for attachment described above, for example an attachment means 60 incorporated as a component of the impact detection composite 10 and/or as part of the shell 310 or padding 320. In a refinement, the protective shell 310 can include a viewport 316 (e.g., an open area or a transparent window or section of the shell 310) configured to provide optical access from the protective shell 310 outer surface 312 to the interface between the protective shell 310 inner surface 314 and the protective padding 320 outer surface 322. Positioning of an impact detection composite 10 at this interface provides a convenient manner for optical detection (visual or otherwise) of an optically detectable property associated with the indicator 36 of the substrate 10 (e.g., line-of-sight inspection of the composite 10 without having to remove the garment 300 from the user U).

In an embodiment, the impact detection composite 10 can be incorporated into/onto a shipping or storage container to detect damage resulting from an impact and/or verify the integrity of the container. As generically illustrated in FIG. 6, a shipping or storage container 400 includes an outer containment structure 410 having an outer surface 412 and an inner surface 414, and the container 400 includes internal contents or components 420 contained therein. The containers 400 can include crates and boxes of cardboard or wood or otherwise. The contents 420 also can include packing inserts (e.g., foamed polymer, cardboard or otherwise) or articles to be stored or shipped. As illustrated, the impact detection composite 10 can be mounted/affixed to an interior and/or exterior surface of the container 400 wall 410 and/or the contents 420, for example via the attachment means 60 as shown in FIGS. 1 and 2. Inspection of the impact detection composite 10 both before and after a storage time or shipping event can be performed to verify whether the container 400 and/or its contents 420 sustained any substantial impact or impact events during the storage time or shipping event (e.g., if the indicator 36 detectable property is detected afterwards).

Figure 6:
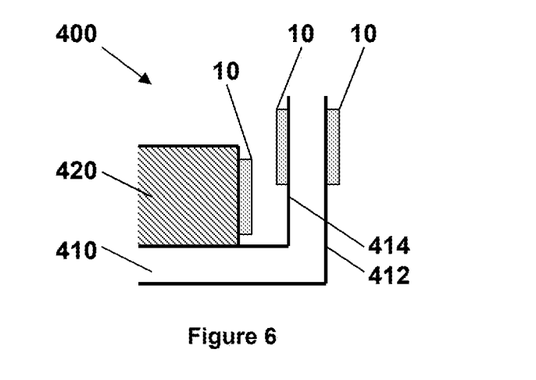
FIG. 6 is a side cross sectional view of a container or electronic apparatus incorporating an impact detection composite according to the disclosure.

In an embodiment, the impact detection composite 10 can be incorporated into/onto an electronic apparatus to detect damage resulting from an impact and/or verify the integrity of the apparatus. FIG. 6 can similarly illustrate this embodiment, for example where an electronic apparatus 400 includes an outer containment structure 410 having an outer surface 412 and an inner surface 414, and the apparatus 400 includes internal components 420 contained therein. The apparatus 400 can include any electronic apparatus such as a television, a computer monitor, a computer, a tablet computer, a smart phone or other phone, etc. As illustrated, the impact detection composite 10 can be mounted/affixed to an interior and/or exterior surface of the apparatus 400 wall 410 and/or the contents 420, for example via the attachment means 60 as shown in FIGS. 1 and 2. Inspection of the impact detection composite 10 both before and after a storage time, shipping event, or other usage interval can be performed to verify whether the apparatus 400 sustained any substantial impact or impact events during the time, event, or interval (e.g., if the indicator 36 detectable property is detected afterwards).

EXAMPLES

The following examples illustrate the disclosed articles and methods, but are not intended to limit the scope of any claims thereto.

The following abbreviations are used herein: "MC" refers to microcapsules; "SDS" refers to sodium dodecyl sulfate; "APTES" refers to (3-aminopropyl)triethoxysilane; and "Comm" refers to commercially available latex.

General

The microcapsules were made using silica encapsulation chemistry, as described above. The microcapsules included olive oil as an internal fluid medium and a dye indicator solubilized in the olive oil. The size of the microcapsules was dependent, at least in part, on the conditions of the silica encapsulation reaction. Typically, the microcapsules had an average diameter on the order of tens of micrometers.

Polyurethane foams for incorporation into the polymeric matrix were prepared using known methods. The polyurethane foams were then soaked in an aqueous dispersion of microcapsules, which were incorporated into (e.g., distributed throughout the interior volume) the foam polymer matrix upon drying. No plasticizer was included in the polymer matrix. The concentration of microcapsules in the dispersion was 1-18 wt. %. The foam with the incorporated microcapsules was then fixed onto the package or the article where impact was tested. In some instances, a detection substrate (e.g., white paper) could be affixed to the opposing side of the foam to facilitate detection of the indicator (e.g., dye) upon release from ruptured microcapsules. Soft/flexible PU foam matrices with microcapsules therein did not result in a visible color change upon impact to the matrix, likely due to the ability of the flexible foam to dissipate the energy resulting from the impact. Stiff/rigid PU foam matrices with microcapsules therein resulted in a visible color change upon impact to the matrix when the microcapsules were included at a high loading level of about 18 wt. %, but not at lower loading levels of about 1 wt. % and 5 wt. %, Latex for incorporation into the polymeric matrix was prepared using the general procedure described herein. Methyl methacrylate (MMA) and butyl acrylate (BA) were selected as illustrative monomers for preparing latexes via emulsion polymerization. The MMA and BA were polymerized in aqueous emulsion at 70° C. for 3-5 hours. The relative amounts of the two monomers were varied to obtain latexes having different Tg values. Sodium dodecyl sulfate (SDS) was used as surfactant and sodium persulfate (SPS) as initiator, both materials are commercially available and safe to handle.

A series of polymeric matrices containing latexes were prepared having Tg values from −25° C. to 35° C. (e.g., −22° C., −12° C., −5° C.) by varying the weight percent of each monomer in the copolymer. The solids content of these latexes was 10 wt. %, 20 wt. %, or 30 wt. %. No plasticizer was included in the polymer matrix. A latex polymeric matrix containing latex having microcapsules distributed therein was formed as follows: The desired amount of microcapsule (dispersed in $H_2O$/SDS) was added to latex in a vial and sonicated (e.g., 5 minutes (amp.=20% pulse=2 sec. on and 5 sec. off)). A coating caster was used to cast the mixture on a printing paper. The coated papers have clean and stable background color as time goes. The coated papers could dry at room temperature for 24 hours, and then it was tested for color change after applying impact. No color change was observed after impact.

Polymeric matrices containing latex were also prepared using a mixture of commercially available latex (e.g. an acrylate based latex) and low Tg latex, microcapsules, SDS as a surfactant, and water. Typically, the commercial latex had a Tg of 1° C., and the low Tg latex had a Tg of −22° C. In some instances the low Tg latex had a Tg of −18° C. or −37° C. The mixture of commercially available latex and low Tg latex typically had a solids content of 50 wt. %. No plasticizer was included in the polymer matrix. The latex polymer matrix with microcapsules therein was applied to a paper substrate detection matrix, and the samples were then tested for color change after impact. The results are shown in Table 1.

TABLE 1

Polymeric matrices containing commercial latex, Low $T_g$ latex, and MC

| $MC^1$ (wt. %) | Comm: Low Tg | Comm Latex (g) | Low Tg (g) | MC (g) | SDS (g) | $H_2O$ (g) | Result |
|---|---|---|---|---|---|---|---|
| 10 wt. % MC | 4:6 | 1.1976 | 1.8017 | 0.1504 | 0.09 | 1 | No color change |
| | 3:7 | 0.9097 | 2.1021 | 0.1512 | 0.0169 | 1 | Little delay/color change not clear |
| | 2:8 | 0.638 | 2.4053 | 0.1519 | 0.0086 | 1 | No color change |
| | 1:9 | 0.3022 | 2.7301 | 0.152 | 0.0082 | 1 | No color change |
| | 9:1 | 9.0478 | 1.0098 | 0.5025 | 0.0283 | 2.54 | Delay (30 min) clear color change |
| | 8:2 | 8.269 | 2.016 | 0.487 | 0.026 | 2.5 | Delay, unclear color change |
| | 7:3 | 2.1352 | 0.9048 | 0.1505 | 0.0077 | 1 | Delay, unclear color change |
| | 6:4 | 1.8491 | 1.2021 | 0.151 | 0.0155 | 1 | Delay, unclear color change |
| | 5:5 | 1.5119 | 1.504 | 0.1515 | 0.0083 | 1 | Immediate, unclear color change |
| | 4:6 | 1.1976 | 1.8017 | 0.1504 | 0.09 | 1 | No color change |
| | 3:7 | 0.9097 | 2.1021 | 0.1512 | 0.0169 | 1 | No color change |
| | 2:8 | 0.638 | 2.4053 | 0.1519 | 0.0086 | 1 | No color change |
| | 1:9 | 0.3022 | 2.7301 | 0.152 | 0.0082 | 1 | No color change |
| 20 wt. % MC | 4:6 | 0.8009 | 1.2024 | 0.2008 | 0.0106 | 1.1 | No color change |
| | 3:7 | 0.126 | 0.287 | 0.04 | 0.006 | 0.3 | No color change |
| | 2:8 | 0.4078 | 1.5985 | 0.208 | 0.012 | 1.1 | No color change |
| 30 wt. % MC | 4:6 | 0.8129 | 1.2041 | 0.3089 | 0.0358 | 1.5 | No color change |
| | 3:7 | 0.6072 | 1.414 | 0.3079 | 0.0261 | 1.5 | No color change |
| | 2:8 | 0.4055 | 1.6 | 0.3022 | 0.0149 | 1.5 | No color change |
| 40 wt. % MC | 4:6 | 0.8134 | 1.2273 | 0.4086 | 0.0193 | 2 | No color change |
| | 3:7 | 0.6132 | 1.4035 | 0.411 | 0.0373 | 2 | No color change |
| | 2:8 | 0.4 | 1.6085 | 0.4087 | 0.19 | 2 | No color change |

[1]The microcapsule content (MC) in weight % is based on the solids fraction of the latex composition, which is 50 wt. % for both the commercial and low-Tg latexes used in this and the other examples.

A composite material was formed using the commercial latex above as a polymer matrix, olive oil at various concentrations as a plasticizer, and microcapsules dispersed in the matrix. The composite materials were applied to a paper substrate and tested for color change after impact. Color change was detectable after impact at high loading levels of olive oil, but the olive oil tended to bleed through to the paper substrate and resulted in an unstable background. Color change was not detectable after impact at low loading levels of olive oil.

Example 1

This example demonstrates an impact detection composite in accordance with a refinement of the disclosure. The impact detection composite contained a polymeric matrix containing a latex, a plasticizer, and microcapsules, as disclosed herein.

As shown in Table 2, polymeric matrices were prepared as described above using the commercial latex, tributyl citrate as a plasticizer, microcapsules, EO-PO-EO (as a surfactant), and water. The latex polymer matrix with plasticizer and microcapsules therein was applied to a paper substrate detection matrix, and the samples were then tested for color change after impact. The results are shown in Table 2.

TABLE 2

Impact detection composite containing latex, tributyl citrate, and MC

| Tributyl Citrate (wt. %) | MC (wt. %) | Latex (g) | Tributyl citrate (g) | MC (g) | EO-PO-EO (g) | $H_2O$ (g) | Result |
| --- | --- | --- | --- | --- | --- | --- | --- |
| 10 | 20 | 1.0012 | 0.1133 | 0.1108 | 0.007 | 0.95 | Immediate few red, 2 min clear red |
|    | 30 | 1.0066 | 0.1127 | 0.1644 | 0.0091 | 1.2 | Immediate few red, 2 min clear red |
|    | 40 | 1.0284 | 0.1083 | 0.2209 | 0.0116 | 1.2 | Immediate few red, 2 min clear red |
| 20 | 20 | 1.03 | 0.2123 | 0.122 | 0.0069 | 0.9 | Immediate few red, 2 min clear red |
|    | 30 | 1.0211 | 0.2028 | 0.1819 | 0.0107 | 1.2 | Immediate few red, 1 min clear red |
|    | 40 | 1.0106 | 0.2004 | 0.24 | 0.0137 | 1.2 | Immediate few red, 3 min clear red |
| 30 | 20 | 1.0196 | 0.3078 | 0.1308 | 0.008 | 1 | 10 min, unclear red |
|    | 30 | 1.0014 | 0.3042 | 0.1962 | 0.0105 | 1.2 | Immediate few red, 1 min clear red |
|    | 40 | 1.0075 | 0.3041 | 0.2631 | 0.0192 | 1.4 | Immediate clear red |

As demonstrated by the data in Table 2, an impact detection composite containing tributyl citrate as a plasticizer resulted in a fast and clear color change. Without wishing to be bound to any particular theory, it is believed that the tributyl citrate increases the diffusion rate of the dye after the rupture of the microcapsules to allow the dye to migrate faster to the surface, which results in fast and clear color change. In some cases, however, the stability of the background was poor.

Example 2

This example demonstrates an impact detection composite in accordance with a refinement of the disclosure. The impact detection composite contained a polymeric matrix containing a latex, a plasticizer, and microcapsules.

As shown in Table 3, polymeric matrices were prepared as described above using the commercial latex; APTES as a plasticizer, microcapsules, SDS as surfactant, and water. The latex polymer matrix with plasticizer and microcapsules therein was applied to a paper substrate detection matrix, and the samples were then tested for color change after impact. The results are shown in Table 3.

TABLE 3

Impact detection composite containing latex, APTES, and MC

| Latex (g) | APTES (g) | MC (wt. %) | MC (g) | SDS (g) | $H_2O$ (mL) | Result |
| --- | --- | --- | --- | --- | --- | --- |
| 1.0143 | 0.213 | 40 | 0.2401 | 0.0154 | 2.8 | Immediate few red, few seconds clear red |
| 1.012 | 0.2034 | 40 | 0.241 | 0.0136 | 2.9 | Immediate few red, few seconds clear red |
| 1.0032 | 0.2015 | 50 | 0.3024 | 0.0163 | 3.5 | 1 min, clear red |
| 1.0009 | 0.313 | 40 | 0.2609 | 0.0132 | 3.3 | 1 min, clear red |
| 1.0008 | 0.3047 | 50 | 0.3248 | 0.0195 | 3.5 | 1 min, clear red |

As demonstrated by the data in Table 3, when APTES was mixed with the formula of commercial latex (as matrix) and microcapsules, the results were consistent and fast (less than a 1 minute) and clear color change was obtained. Without wishing to be bound to any particular theory, it is believed that the effect could be due to the ability of the ethoxysilyl groups to bind the microcapsules, which have silica-based capsule shells, to the matrix and facilitate the cleavage of the microcapsules to allow the dye to flow easily to the surface of the paper.

The results from the APTES composites were repeated multiple times (40 wt. % MC and 2.8 mL $H_2O$) to test the consistency and reproducibility of the results. In all the tested experiments, the background was stable. The results are shown in Table 4.

TABLE 4

Impact detection composite containing latex, APTES, and 40 wt. % MC

| Latex (g) | APTES (g) | MC (g) | SDS (g) | Result |
|---|---|---|---|---|
| 1.0029 | 0.2087 | 0.2434 | 0.0126 | Immediate few red, few seconds clear red |
| 1.0245 | 0.2035 | 0.2403 | 0.0234 | Immediate few red, few seconds clear red |
| 1.0278 | 0.2    | 0.2431 | 0.0118 | Immediate few red, few seconds clear red |
| 1.0168 | 0.2026 | 0.2417 | 0.013  | Immediate few red, few seconds clear red |
| 1.0044 | 0.207  | 0.2427 | 0.0124 | Immediate few red, few seconds clear red |
| 1.0072 | 0.203  | 0.2431 | 0.0119 | Immediate few red, few seconds clear red |
| 1.0298 | 0.216  | 0.2428 | 0.0139 | Immediate few red, few seconds clear red |
| 1.0249 | 0.2016 | 0.2447 | 0.0153 | Immediate few red, few seconds clear red |

The results demonstrate that a polymeric matrix including latex, a plasticizer (e.g., APTES), MC, and SDS can be used to efficiently incorporate microcapsules to obtain an impact detection composite exhibiting a fast color change having a stable background.

Because other modifications and changes varied to fit particular operating requirements and environments will be apparent to those skilled in the art, the disclosure is not considered limited to the example chosen for purposes of illustration, and covers all changes and modifications which do not constitute departures from the true spirit and scope of this disclosure.

Accordingly, the foregoing description is given for clearness of understanding only, and no unnecessary limitations should be understood therefrom, as modifications within the scope of the disclosure may be apparent to those having ordinary skill in the art.

All patents, patent applications, government publications, government regulations, and literature references cited in this specification are hereby incorporated herein by reference in their entirety. In case of conflict, the present description, including definitions, will control.

Throughout the specification, where the articles, compositions, processes, kits, or apparatus are described as including components, steps, or materials, it is contemplated that the compositions, processes, or apparatus can also comprise, consist essentially of, or consist of, any combination of the recited components or materials, unless described otherwise. Component concentrations can be expressed in terms of weight concentrations, unless specifically indicated otherwise. Combinations of components are contemplated to include homogeneous and/or heterogeneous mixtures, as would be understood by a person of ordinary skill in the art in view of the foregoing disclosure.

PARTS SUMMARY

10: impact detection composite
10A, 10B: different regions of impact detection composite
20: polymeric substrate containing a plasticizer
22, 24, 26: top surface, bottom surface, and interior volume of polymeric matrix
30, 130, 230: microcapsules
32, 34, 36 (132, 134, 136; 232, 234, 236): outer shell, interior microcapsule volume, and contained indicator of microcapsules
50: detection substrate on outer surface of polymeric matrix
60: means for attachment
300: protective garment for user U
310: protective shell
312, 314: outer surface, inner surface of protective shell
316: viewport
320: protective padding
322, 324, 326: outer surface, inner surface, and interior volume of protective padding
400: container or electronic apparatus
410: outer containment structure
412, 414: outer surface, inner surface of outer containment structure
420: internal contents or components

What is claimed is:

1. An impact detection composite comprising:
   a polymeric matrix;
   a plasticizer in the polymeric matrix, the plasticizer comprising an organosilane according to formula (I):

$$X\text{—}R\text{—}Si(OR^1)(OR^2)(OR^3) \qquad (I)$$

wherein:
   R, $R^1$, $R^2$, and $R^3$ are independently selected from hydrocarbon groups containing from 1 to 20 carbon atoms; and
   X is selected from hydrogen, an amino group, an epoxy group, a thiol group, a (meth)acrylic group, and a hydroxy group;
   a plurality of microcapsules distributed throughout an interior volume of the polymeric matrix; wherein (A) each microcapsule comprises (i) an outer shell defining an interior microcapsule volume, and (ii) an indicator contained in the interior microcapsule volume, and (B) each microcapsule is configured to release the indicator upon rupture of the microcapsule to generate a change in a detectable property associated with the indicator; and
   optionally a detection substrate on an outer surface of the polymeric matrix.

2. The impact detection composite of claim 1, wherein the polymeric matrix comprises a polymer selected from the group consisting of poly(alkyl)acrylates, poly(alkyl)methacrylates, poly(vinyl nitriles), polyethylenes, polypropylenes, other polyolefins, polystyrenes, poly(ethylene-vinyl acetates), poly(vinyl chlorides), poly(acrylonitrile-butadiene-styrenes), polychloroprenes, polyurethanes, polyimides, polyetherimides, polyphenyleneoxides, polysiloxanes, polyepoxides, polyesters, phenolic resins, urea-formaldehyde resins, cellulose acetates, and combinations thereof.

3. The impact detection composite of claim 1, wherein the polymeric matrix is in the form of a film.

4. The impact detection of composite of claim 3, wherein the film is a cast film.

5. The impact detection of composite of claim 3, wherein the film comprises latex.

6. The impact detection composite of claim 1, wherein the polymeric matrix is in the form of a foam.

7. The impact detection composite of claim 1, wherein the polymeric matrix is optically translucent or transparent.

8. The impact detection composite of claim 1, wherein the plasticizer is present in the impact detection composite in an amount in a range of 0.1 to 40 wt. % relative to the impact detection composite.

9. The impact detection composite of claim 1, wherein the outer shell of the microcapsules comprises silica.

10. The impact detection composite of claim 1, wherein the indicator comprises an optical indicator contained in a fluid medium and having an optical detectable property.

11. The impact detection composite of claim 1, wherein each microcapsule has a characteristic impact threshold prior to rupture of the microcapsule and release of the indicator from the interior microcapsule volume to generate an irreversible change in a detectable property associated with the indicator.

12. The impact detection composite of claim 1, wherein the detectable property is selected from the group consisting of an optical property, an olfactory property, a chemical property, an electrical property, an electromagnetic property, and any combination thereof.

13. The impact detection composite of claim 1, wherein the microcapsules are present in the impact detection composite in an amount in a range of 1 to 50 wt. % relative to the impact detection composite.

14. The impact detection composite of claim 1, further comprising a means for attachment on an outer surface of the polymeric matrix.

15. A shipping or storage container comprising the impact detection composite of claim 1 spatially positioned in or on the container to detect impact experienced by the container during shipment or storage.

16. A protective garment comprising the impact detection composite of claim 1 spatially positioned in or on the protective garment to detect impact experienced by a wearer of the protective garment.

17. A footwear garment comprising the impact detection composite of claim 1 spatially positioned in or on the footwear garment to detect impact experienced by the impact detection composite from a wearer of the footwear garment.

18. An electronic apparatus comprising the impact detection composite of claim 1 spatially positioned in or on the apparatus to detect impact experienced by the apparatus during shipment, storage, or use.

19. A vehicle or component thereof comprising the impact detection composite of claim 1 spatially positioned in or on the vehicle or the component thereof to detect impact experienced the vehicle.

20. An impact detection composite comprising:
a polymeric matrix;
a plasticizer in the polymeric matrix;
a plurality of microcapsules distributed throughout an interior volume of the polymeric matrix; wherein (A) each microcapsule comprises (i) an outer shell defining an interior microcapsule volume, (ii) an indicator contained in the interior microcapsule volume, and (iii) a fluid medium contained in the interior microcapsule volume in which the indicator is dissolved, and (B) each microcapsule is configured to release the indicator upon rupture of the microcapsule to generate a change in a detectable property associated with the indicator; and
optionally a detection substrate on an outer surface of the polymeric matrix;
wherein condition (I) or condition (II) is satisfied:
(I) the fluid medium comprises a hydrophilic fluid medium containing the indicator, and the plasticizer comprises a hydrophilic plasticizer; or
(II) the fluid medium comprises an oleophilic fluid medium containing the indicator, and the plasticizer comprises an oleophilic plasticizer.

21. The impact detection composite of claim 20, wherein the condition (I) is satisfied such that:
the fluid medium comprises the hydrophilic fluid medium; and
the plasticizer comprises the hydrophilic plasticizer.

22. The impact detection composite of claim 20, wherein the condition (II) is satisfied such that:
the fluid medium comprises the oleophilic fluid medium; and
the plasticizer comprises the oleophilic plasticizer.

23. The impact detection composite of claim 20, wherein the plasticizer is selected from the group consisting of hydrophilic plasticizers, oleophilic plasticizers, and combinations thereof.

24. The impact detection composite of claim 20, wherein the plasticizer is selected from the group consisting of mono-, di-, and tri-glycerides of fatty acids, organosilanes and siloxanes, mono-, di-, and tri-esters of mono-, di-, and tri-carboxylic acids, trimellitates, adipates, sebacates, maleates, acetylated monoglycerides, methyl ricinoleate, azelates, benozates, di-alkyl phthalates, alkyl sulphonic acid phenyl esters, sulfonamindes, organophosphates, glycols, polyols, sugar alcohols, polyethers, and combinations thereof.

25. The impact detection composite of claim 20, wherein the plasticizer comprises a polysiloxane or an oligosiloxane comprising repeat units according to formula (II):

(II)

wherein:
$R^1$ and $R^2$ are independently selected from hydrocarbon groups containing from 1 to 20 carbon atoms.

* * * * *